UNITED STATES PATENT OFFICE.

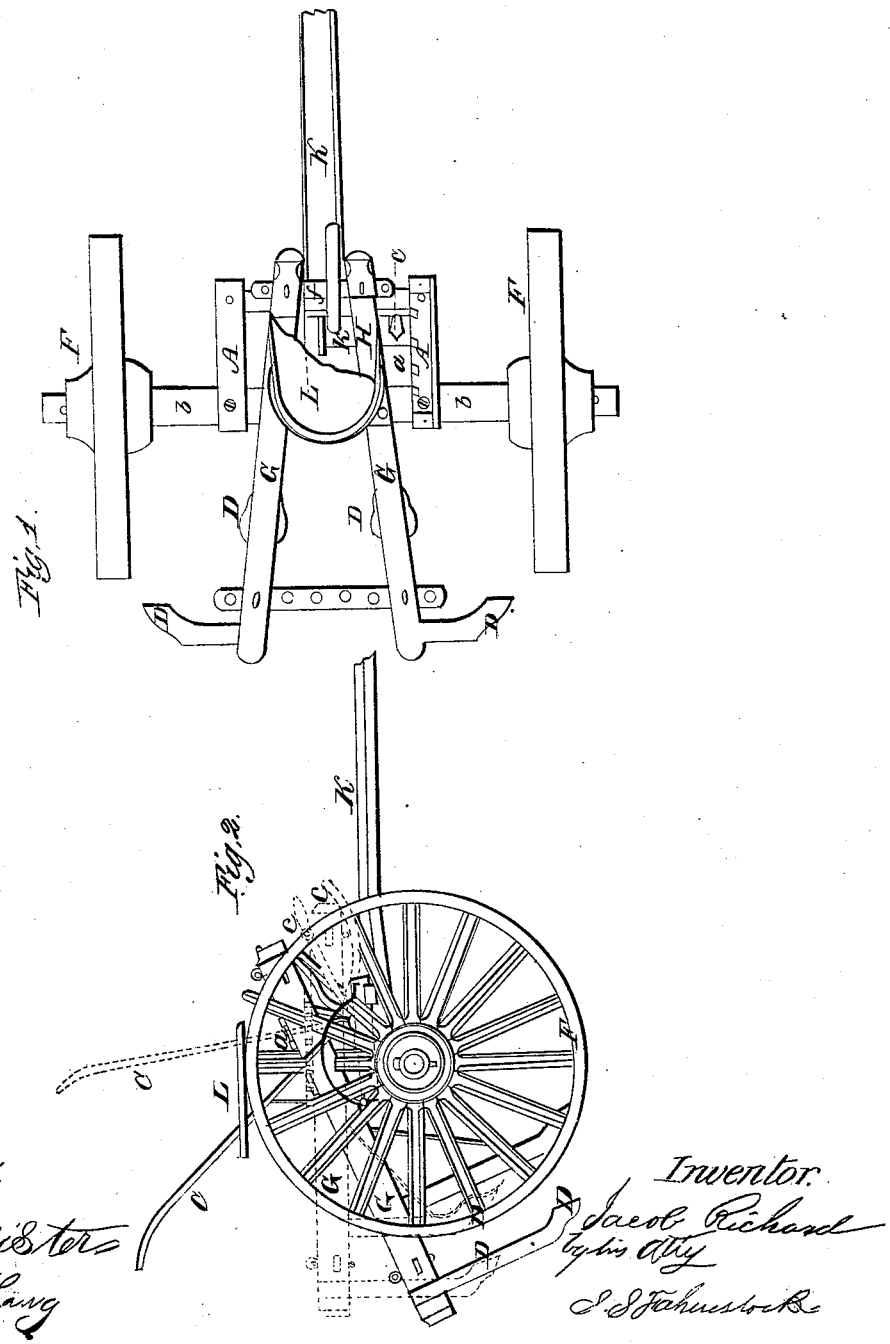

JACOB REICHARD, OF FAYETTEVILLE, PENNSYLVANIA.

IMPROVEMENT IN CULTIVATORS.

Specification forming part of Letters Patent No. 81,108, dated August 18, 1868.

*To all whom it may concern:*

Be it known that I, JACOB REICHARD, of Fayetteville, in the county of Franklin and State of Pennsylvania, have invented a certain new and useful Improvement in Cultivators, of which the following is a full, clear, and exact description, reference being had to the accompanying drawings, and to the letters of reference marked thereon.

The nature of my invention consists in placing the frame carrying the cultivator-teeth under the ready control of the driver, to be hereinafter described.

In the drawings, Figure 1 represents a top view of my invention; Fig. 2, a side view of the same.

Like letters represent like parts in the two figures.

K is the tongue; F, the wheels. $b$ is the axle, and attached to this is a frame, A, which is also secured to the tongue. This frame and tongue carry a roller, $k$, to which is attached a bifurcated arm, $c$, which embraces a cross-piece, $f$, under the driver's seat, and through the lever regulates the inclination of the frame G, which carries the cultivator-teeth D. One end of this roller $k$ works in the frame A and the other end in a lug or upright piece attached to the tongue K. At the rear end of frame G any number of downward-projecting arms may be placed, to which must be secured the metal curtivator-teeth D. The frame G is susceptible of being adjusted—that is, contracted or expanded at ease, as seen.

To the frame G, on either side, is attached a metal piece, H, in which are notches $a$, inclined in opposite directions, and in which the lever C takes at the control of the driver.

The operation is as follows: The driver being in place on his seat L and the machine being moved forward, in order to depress the teeth D the driver takes hold of the lever C and pulls backward (thus raising the front of frame G through the bifurcated arm $c$) until the teeth are buried a sufficient distance, when the lever can be dropped into one of the notches $a$, to hold it in the desired position. To reverse the movement the lever C, after having been removed from its slot, is pulled forward, thus raising the cultivator-teeth, when the frame can be held in position, as before.

The slots for holding lever need not be inclined, and the plate may be secured to one of the pieces A, and it may be curved or bowed upward, secured to said piece.

Having thus described my invention, what I claim as new and useful, and desire to secure by Letters Patent of the United States, is—

An improved cultivator, arranged, constructed, and operating substantially in the manner as shown and described, and for the purpose set forth.

JACOB REICHARD.

Witnesses:
   JACOB SHEARMAN,
   JACOB RHODES.